United States Patent
Lin et al.

(10) Patent No.: US 6,876,525 B2
(45) Date of Patent: Apr. 5, 2005

(54) GIANT MAGNETORESISTANCE SENSOR WITH STITCHED LONGITUDINAL BIAS STACKS AND ITS FABRICATION PROCESS

(75) Inventors: Tsann Lin, Saratoga, CA (US); Daniele Mauri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 10/229,491

(22) Filed: Aug. 27, 2002

(65) Prior Publication Data

US 2004/0042130 A1 Mar. 4, 2004

(51) Int. Cl.⁷ .................................................. G11B 5/39
(52) U.S. Cl. ................................................. 360/324.12
(58) Field of Search ................ 360/324.12, 324.11, 360/324.1, 324, 327.1, 327.3; 324/252; 428/693

(56) References Cited

U.S. PATENT DOCUMENTS

| 5,442,507 | A | 8/1995 | Koga et al. | 360/113 |
| 5,491,600 | A | 2/1996 | Chen et al. | 360/113 |
| 5,742,162 | A | 4/1998 | Nepela et al. | 324/252 |
| 5,742,459 | A | 4/1998 | Shen et al. | 360/113 |
| 5,780,176 | A | 7/1998 | Iwasaki et al. | 428/692 |
| 5,808,843 | A | 9/1998 | Kobayashi et al. | 360/113 |
| 5,852,533 | A | 12/1998 | Miyauchi et al. | 360/113 |
| 5,867,351 | A | 2/1999 | Gill | 360/113 |
| 5,874,886 | A | 2/1999 | Araki et al. | 338/32 R |
| 5,883,764 | A | 3/1999 | Pinarbasi | 360/113 |
| 5,889,640 | A | 3/1999 | Hayashi et al. | 360/113 |
| 5,896,251 | A | 4/1999 | Ohsawa et al. | 360/113 |
| 5,928,715 | A | 7/1999 | Ravipati et al. | 427/130 |
| 5,933,297 | A | 8/1999 | Hoshiya et al. | 360/113 |
| 5,968,676 | A | 10/1999 | Araki et al. | 428/692 |
| 5,999,379 | A | 12/1999 | Hsiao et al. | 360/113 |
| 6,483,674 | B1 * | 11/2002 | Kanai et al. | 360/324.12 |
| 6,577,477 | B1 * | 6/2003 | Lin | 360/324.12 |

* cited by examiner

*Primary Examiner*—Angel A Castro
(74) *Attorney, Agent, or Firm*—Robert O. Guillot; Intellectual Property Law Offices

(57) ABSTRACT

A giant magnetoresistance (GMR) magnetic head that includes a GMR read sensor with a stitched longitudinal bias (LB) stack. The GMR read sensor includes seed, pinning, pinned, spacer, sense and cap layers in a read region, and its seed and pinning layers are extended into two side regions. The LB stack is fabricated on the pinning layer in the two side regions and includes separation, seed and LB layers. The separation layer, preferably made of an amorphous film, separates the pinning layer from the seed and LB layers and thereby prevents unwanted crystalline effects of the pinning layer. Monolayer photoresist patterning and chemical mechanical polishing may be incorporated into the fabrication process of the GMR head to attain uniform thicknesses of the separation, seed and LB layers, and to align the midplane of the LB layer at the same horizontal level as the midplane of the sense layer.

20 Claims, 4 Drawing Sheets

GIANT MAGNETORESISTANCE SENSOR WITH STITCHED LONGITUDINAL BIAS STACKS AND ITS FABRICATION PROCESS

BACKGROUND OF THE INVENTION

1. Field of the Invention

The present invention relates generally to a read head for a hard disk drive, and more particularly to a giant magnetoresistance (GMR) read head including a GMR read sensor in a read region and stitched longitudinal bias (LB) stacks in two side regions.

2. Description of the Prior Art

In a commonly used giant magnetoresistance (GMR) read head, a GMR read sensor is located in a read region, while a longitudinal bias (LB) stack and a conductor are located in each of two side regions. The GMR read sensor typically comprises nonmagnetic seed layers, an antiferromagnetic pinning layer, ferromagnetic pinned layers, a nonmagnetic spacer layer, a ferromagnetic sense layer, and nonmagnetic cap layers. The LB stack typically comprises a nonmagnetic seed layer and a hard-magnetic LB layer. The conductor typically comprises highly electrically conducting nonmagnetic layers.

The LB layer must exhibit a high coercivity ($H_C$) and thus provide an LB field for stabilizing the sense layer. This stabilization scheme is the most effective when the midplane of the LB layer is located at the same horizontal level as the midplane of the sense layer. In the prior art head fabrication process, however, the LB stack is typically deposited on an amorphous $Al_2O_3$ bottom gap layer in the side regions to prevent some unwanted microstructural effects that causes a decrease in $H_C$, and thus the midplane of the LB layer is located at a horizontal level significantly lower than the midplane of the sense layer. As a result, it is difficult to stabilize the sense layer.

There is therefore a need for a head fabrication process in which the LB layer can exhibit a high $H_C$ and its midplane can be located at the same horizontal level as the midplane of the sense layer, so that the most effective stabilization of the sense layer can be obtained.

SUMMARY OF THE INVENTION

The present invention is an improved GMR read head for a hard disk drive, in which the LB stack is stitched on the lower portion of a GMR read sensor in each of two side regions. The GMR read sensor includes an antiferromagnetic pinning layer that is extended into the two side regions. The LB stack is stitched on the pinning layer in each of two side regions, and it includes an amorphous nonmagnetic separation layer, a nonmagnetic seed layer exhibiting a body-centered-cubic (bcc) structure, and a hard-magnetic LB layer exhibiting a hexagonal-centered-cubic (hcp) structure.

In order to eliminate unwanted effects from the microstructures of the pinning layer, the present invention utilizes the amorphous separation layer to separate the pinning layer from the rest of the LB stack in each of the side regions. On top of the amorphous separation layer, the nonmagnetic seed layer grows freely, exhibiting the bcc structure with its closest packed crystalline planes lying in the film surface. On top of the nonmagnetic seed layer, the LB layer grows epitaxially, exhibiting the hcp structure with preferred crystalline planes lying in the film surface and thus exhibiting a high coercivity ($H_C$).

In the preferred embodiment, the amorphous separation layer preferably comprises a tungsten nitride ($WN_X$) film, where x ranges from 36 to 46 at %. The nonmagnetic seed layer preferably comprises a tungsten (W) film. The head fabrication process is thereby simplified in that a single W target can be utilized to reactively deposit the $WN_X$ film in mixed gases of argon and oxygen, and to directly deposit the W film in the argon gas. The LB layer preferably comprises a Co—xPt or Co—xPt—yCr film, where x ranges from 10 to 50 at % and y ranges from 1 to 20 at %. Through the use of the present invention, the LB stack can now be deposited on top of the pinning layer. In addition to obtaining a high $H_C$ for the LB layer, the midplane of the LB layer can be located at the same horizontal level as the midplane of the sense layer of the GMR read sensor.

It is an advantage of the GMR read head of the present invention that a head fabrication process has been developed to improve a sensor stabilization scheme.

It is another advantage of the GMR read head of the present invention that a head fabrication process has been developed, where the LB stack can be deposited on top of the pinning layer of the GMR sensor in each of two side regions.

It is further advantage of the GMR read head of the present invention that a head fabrication process has been developed, where the midplane of the LB layer can be located at the same horizontal level as the midplane of the sense layer.

It is yet another advantage of the GMR read head of the present invention that a head fabrication process has been developed, where ion milling is applied to only remove the upper portion of the GMR read sensor and thus the lower portion of the GMR read sensor in-situ protects the bottom gap layer from exposing to air.

It is an advantage of the hard disk drive of the present invention that it includes a GMR read head fabricated to improve a sensor stabilization scheme.

It is another advantage of the hard disk drive of the present invention that it includes a GMR read head, in which the LB stack is deposited on top of the pinning layer in each of two side regions.

It is further advantage of the hard disk drive of the present invention that it includes a GMR head, in which the midplane of the LB layer is located at the same horizontal level as the midplane of the sense layer.

It is yet another advantage of the hard disk drive of the present invention that it includes a GMR read head, in which the lower portion of the GMR read sensor in-situ protects the bottom gap layer from exposing to air in the head fabrication process.

These and other features and advantages of the present invention will no doubt become apparent to those skilled in the art upon reading the following detailed description which makes reference to the several figures of the drawings.

IN THE DRAWINGS

DETAILED DESCRIPTION OF THE FIRST EMBODIMENT

Figure 1:
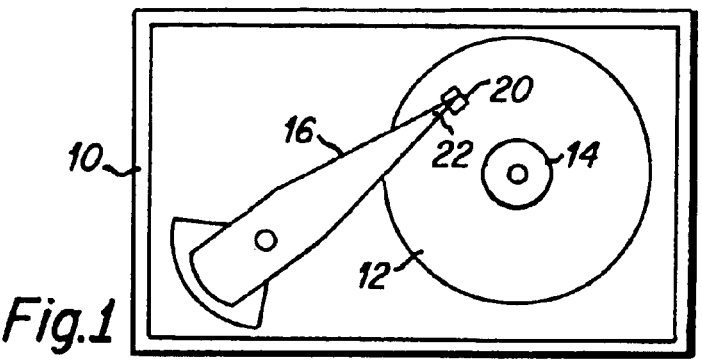
FIG. 1 is a top plan view generally depicting a hard disk drive including a GMR read head of the present invention.

FIG. 1 is a top plan view that depicts significant components of a hard disk drive 10. The hard disk drive includes an air bearing slider that includes a magnetic head 20 generally comprising an $Al_2O_3$—TiC substrate, the GMR read head of the present invention, and a write head. The hard disk drive 10 also includes a hard disk 12 on which a magnetic medium is deposited. The hard disk is rotatably mounted upon a motorized spindle 14. An actuator arm 16 is pivotally mounted within the hard disk drive 10 with the magnetic heads 20 disposed upon a distal end 22 of the actuator arm 16. A typical hard disk drive 10 may include a plurality of hard disks 12 that are rotatably mounted upon the motorized spindle 14 and a plurality of actuator arms 16 having magnetic heads 20 mounted upon the distal ends 22 of the actuator arms 16. As is well known to those skilled in the art, when the hard disk drive 10 is operated, the hard disk 12 rotates upon the motorized spindle 14 and the air bearing slider is flying above the surface of the rotating hard disk 12.

Figure 2:
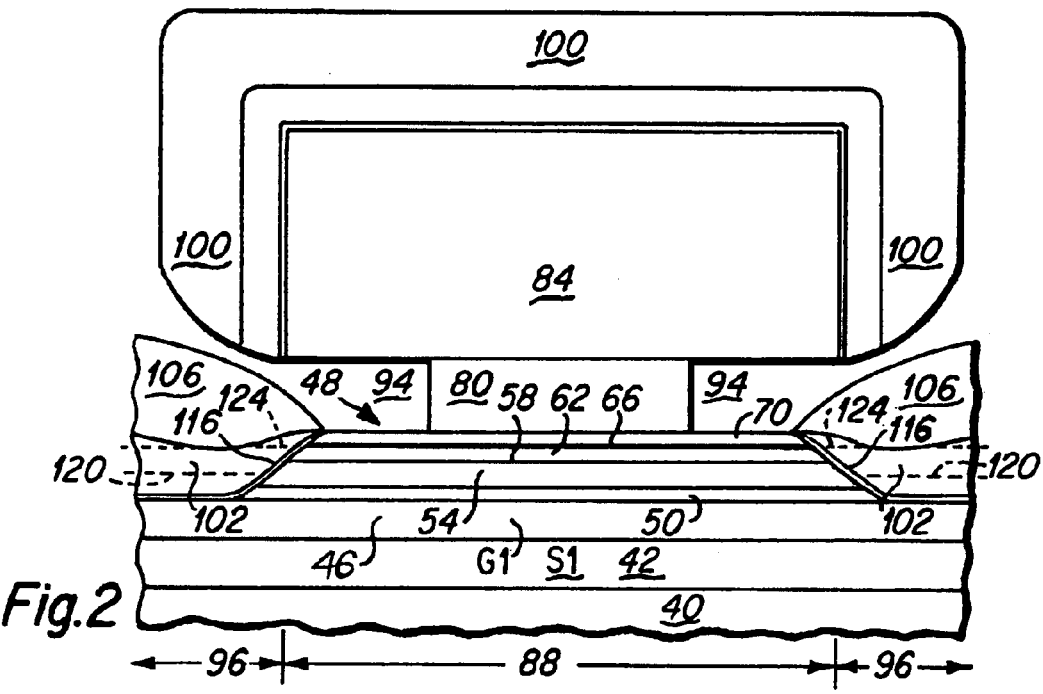
FIG. 2 is a side cross-sectional view depicting a GMR read head during the fabrication process of the GMR read head, as is known in the prior art.
Figure 3:
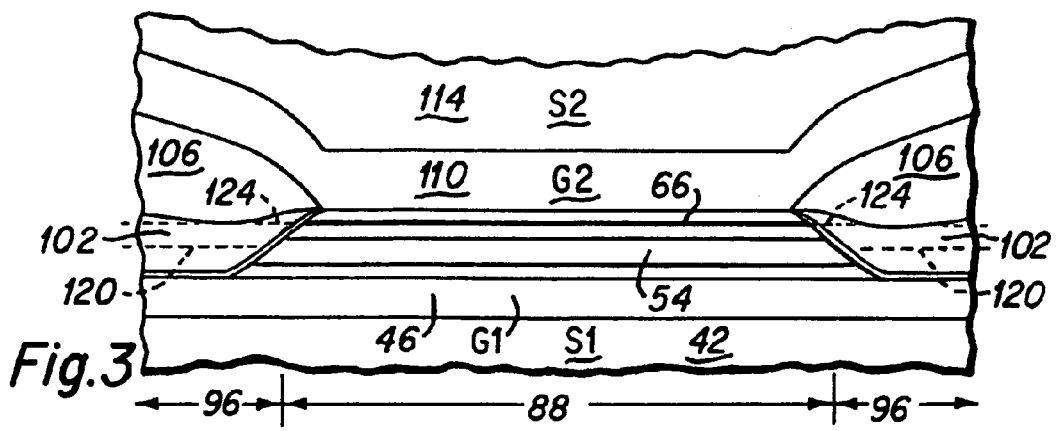
FIG. 3 is a side cross-sectional view depicting a GMR read head after completing the fabrication process of the GMR read head, as is known in the prior art.

FIG. 2 is a side cross-sectional view depicting a GMR read head during the fabrication process of the GMR read head, as is known in the prior art, and FIG. 3 is a side cross-sectional view depicting a GMR read head after completing its fabrication process as is known in the prior art. This prior art fabrication process is improved in the present invention, and FIGS. 2 and 3 therefore serve as a suitable starting point for the description of this invention.

A wafer 40 used in the fabrication process typically comprises an ~1.2 mm thick $Al_2O_3$—TiC ceramic substrate 40 coated with a ~6 μm thick $Al_2O_3$ film. In the fabrication process, as is depicted in FIG. 2, a bottom magnetic shield layer ($S_1$) 42, preferably formed of a 1 μm thick Ni—Fe film, is deposited on the wafer 40. To fabricate a GMR read head with its sense layer located in the midplane of a 80 nm thick read gap, a bottom gap layer ($G_1$) 46, preferably formed of a 10.6 m thick $Al_2O_3$ film, is deposited on the $S_1$ 42. Thereafter, multiple seed layers 50, preferably comprising a 3 nm thick $Al_2O_3$ film, a 3 nm thick Ni—Cr—Fe film, and a 1 m thick Ni—Fe film, are then sequentially deposited on the $G_1$ 46. The $Al_2O_3$ film used as the $G_1$ 46 is preferably directly sputtered in an argon gas from an $Al_2O_3$ target, while the $Al_2O_3$ film used as the seed layer is preferably reactively sputtered in mixed argon and oxygen gases from an Al target. A pinning layer 54, preferably comprising a 15 nm thick Pt—Mn, is then deposited on the multiple seed layers 50. Thereafter, pinned layers 58, preferably comprising a 1.6 nm thick Co—Fe film, a 0.8 nm thick Ru film and a 1.8 m thick Co—Fe film, are deposited on the pinning layer 54. A spacer layer 62, preferably formed of a 2.2 nm Cu—O film, is deposited on the pinned layers 58. Thereafter, a sense layer 66, preferably formed of a 2 nm Co—Fe film, is deposited on the spacer layer 62. Cap layers 70, preferably comprising a 0.6 nm thick Cu film and 6 nm thick Ta film, are then deposited on the sense layer 66.

After the depositions, the wafer is annealed in a 10 kOe magnetic field perpendicular to an alignment mark for 5 hours at 265° C. Bilayer photoresists, comprising a lower photoresist 80 and an upper photoresist 84, are then applied and exposed in a photolithographic tool to mask the GMR read sensor in a read region 88 for defining a sensor width, and subsequently developed in a solvent to form undercuts 94. The GMR read sensor in unmasked side regions 96 is removed by ion milling until the $G_1$ 46 is exposed. With reference to FIG. 3, the LB stack 102, preferably comprising a 3 nm thick Cr film and a 40 nm thick Co—Pt—Cr film, is then deposited onto the unmasked side regions 96. Thereafter, the conductor 106, preferably comprising a 3 nm thick Cr film and a 80 nm thick Rh film and a 3 nm thick Ta film, is also deposited also onto the unmasked side regions 96. These depositions of the LB stack 102 and the conductor 106 create overhangs 100 upon the sides of the photoresist 84. The bilayer photoresists are then lifted off. Subsequently, the GMR read sensor is patterned for defining a sensor height, connected with a recessed conductor (preferably comprising a 3 nm thick Ta film, a 80 nm thick Cu film and a 3 nm thick Ta film), covered by a top gap layer ($G_2$) 110 formed of a 32.4 nm thick $Al_2O_3$ film, and a second magnetic shield layer ($S_2$) 114.

After the completion of this fabrication process of the GMR read head, the fabrication process of the write head starts. After the completion of the fabrication processes of the GMR read and write heads, the GMR read and write heads are lapped along the alignment mark until designed sensor height and throat height are attained.

In fabricating the read head, to ensure good electrical and magnetic contacts of the GMR read sensor with the LB stack 102 and the conductor 106, ion milling of the GMR read sensor is typically applied by tilting an ion beam gun by 10° from a normal line for the formation of two short sensor edges 116, and the depositions of the LB stack 102 and the conductor 106 are conducted by tilting an ion beam gun by 20° from the normal line for good coverage over the sensor edges. The two short sensor edges 116 are needed to prevent unwanted domain instability, while the good coverage is needed to ensure sufficient thickness of the LB stack 102 and the conductor 106 at the sensor edges 116 and to ensure a steady electrical flow without an electrostatic discharge.

It is difficult for this prior art GMR read head to stabilize the sense layer 66, due to severe ion milling applied to the GMR read sensor in the unmasked side regions and shadowing effects of the bilayer photoresists with the overhangs 100 formed during the depositions of the LB stack 102 and the conductor 106. Severe ion milling creates a deep trench in the unmasked side regions, and thus the midplane 120 of the LB layer 102 deposited on the $G_1$ 46 within the deep trench is located far below the midplane 124 of the sense layer 66. Shadowing effects cause the deposited films to form "tapers" at the sensor edges 116, and thus the designed film thicknesses cannot be attained at the sensor edges. Particularly, the Cr seed layer of the LB stack 102 cannot be thick enough or even does not exist at sensor edges 116, and a Co—Pt—Cr LB layer deposited on a Cr seed layer thinner than 1.5 nm cannot exhibit a high $H_C$. In addition, the Co—Pt—Cr LB layer cannot be thick enough or even does not exist at the sensor edges, so that it is difficult to attain a designed $H_C$ high enough to suppress domain activities at the sensor edges 116 and a designed magnetic moment comparable to that of the sense layer 66. As a result, an LB field induced from the LB layer 102 is generally not high enough to adequately stabilize the sense layer 66.

Figure 4:
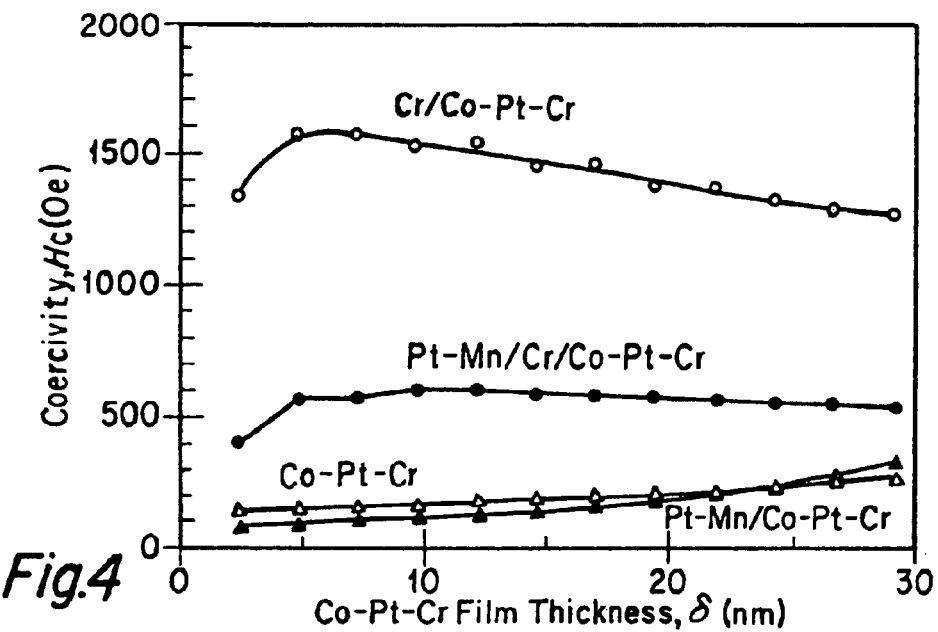
FIG. 4 is a chart showing the coercivity ($H_C$) versus the thickness (δ) of the Co—Pt—Cr film deposited on various seed layers used in the prior art.

To solve these issues in the prior art fabrication process, the Cr seed and Co—Pt—Cr LB films that are deposited on the $G_1$ layer within the deep trench are much thicker than would otherwise be designed. The thickness of the Cr seed layer increases from 1.5 to 3 nm, while the thickness of the Co—Pt—Cr hard magnetic film increases from 12.8 to 40 nm (corresponding to three and nine times of the magnetic moment of the sense layer, respectively). As shown in FIGS. 3 and 4 (discussed herebelow), with such thick Cr seed and Co—Pt—Cr LB films, parts of the Cr and Co—Pt—Cr "tapers" can be located above the midplane 124 of the sense layer 66, and the Cr and Co—Pt—Cr "tapers" are thick enough to stabilize the sense layer 66. However, when the sense layer is stabilized, very high magnetic moments in the unmasked side regions cause substantial decreases in signal sensitivity and read efficiency.

As is well known to those skilled in the art, the Co—Pt—Cr hard magnetic film requires an underlying Cr film to attain a high in-plane coercivity ($H_C$) in order to stabilize the sense layer. FIG. 4 shows $H_C$ versus the Co—Pt—Cr film thickness for Co—Pt—Cr and Cr(3)/Co—Pt—Cr films (thickness in nm) deposited on an $Al_2O_3$-coated substrate. The use of the underlying Cr film leads the Co—Pt—Cr film to exhibit an $H_C$ of beyond 1000 Oe. An X-ray diffraction pattern (not shown) taken from the Co—Pt—Cr film indicates that it grows "freely" on the amorphous $Al_2O_3$ film, exhibiting a hexagonal-centered-cubic (hcp) structure (a=0.256 nm and c=0.407 nm) with its closest packed {0001} crystalline plane lying in the film surface. Another X-ray diffraction pattern (not shown) taken from the Cr/Co—Pt—Cr films indicates that the Cr film grows "freely" on the amorphous $Al_2O_3$ film, exhibiting a body-centered-cubic (bcc) structure (a=0.290 nm) with its closest packed {110} crystalline planes lying in the film surface, and the Co—Pt—Cr film then grows "epitaxially" on the Cr film, exhibiting the hcp structure mainly with $\{01\bar{1}0\}$ or $\{01\bar{1}1\}$ crystalline planes lying in the film surface. The use of the Cr film thus causes the <0001> c-axis of the Co—Pt—Cr hcp structure (the easy axis of magnetization) to lie in the film surface, in order to achieve lattice matching between the Cr bcc {011} and the Co—Pt—Cr hcp $\{01\bar{1}0\}$ (or $\{01\bar{1}1\}$) crystalline planes. Due to this epitaxial growth, in-plane magnetic properties of the Co—Pt—Cr film, including $H_C$, are thus improved.

It is crucial not to leave any polycrystalline films in the unmasked side regions before the depositions of the Cr/Co—Pt—Cr films, since these polycrystalline films may affect the "free" growth of the Cr film and the wanted "epitaxial" growth of the Co—Pt—Cr film, thus deteriorating its in-plane magnetic properties. For example, if the Pt—Mn film 54 is left in the side regions, the Co—Pt—Cr and Cr/Co—Pt—Cr films deposited thereon will exhibit a low $H_C$. FIG. 4 also shows $H_C$ vs Co—Pt—Cr film thickness for Pt—Mn(15)/Co—Pt—Cr and Pt—Mn(15)/Cr(3)/Co—Pt—Cr films deposited on the $Al_2O_3$-coated substrate. The existence of the underlying Pt—Mn film 54 leads the Co—Pt—Cr and Cr/Co—Pt—Cr films to exhibit an $H_C$ of below 400 Oe. X-ray diffraction patterns (not shown) taken from the Co—Pt—Cr and Cr/Co—Pt—Cr films indicate that the growth of the Cr and Co—Pt—Cr films is severely affected by the underlying Pt—Mn film, which exhibits a face-centered-tetragonal (fct) structure with its closest packed {111} crystalline plane lying in the film surface. The closest atomic distance in the Pt—Mn fct {111} crystalline plane (0.272 nm) is greater than that in the Cr bcc {110} crystalline plane (0.251 nm) and that in the Co—Pt—Cr $\{01\bar{1}0\}$ or $\{01\bar{1}1\}$ crystalline plane (0.256 nm). As a result, this lattice mismatching leads to a low $H_C$.

Figure 5:
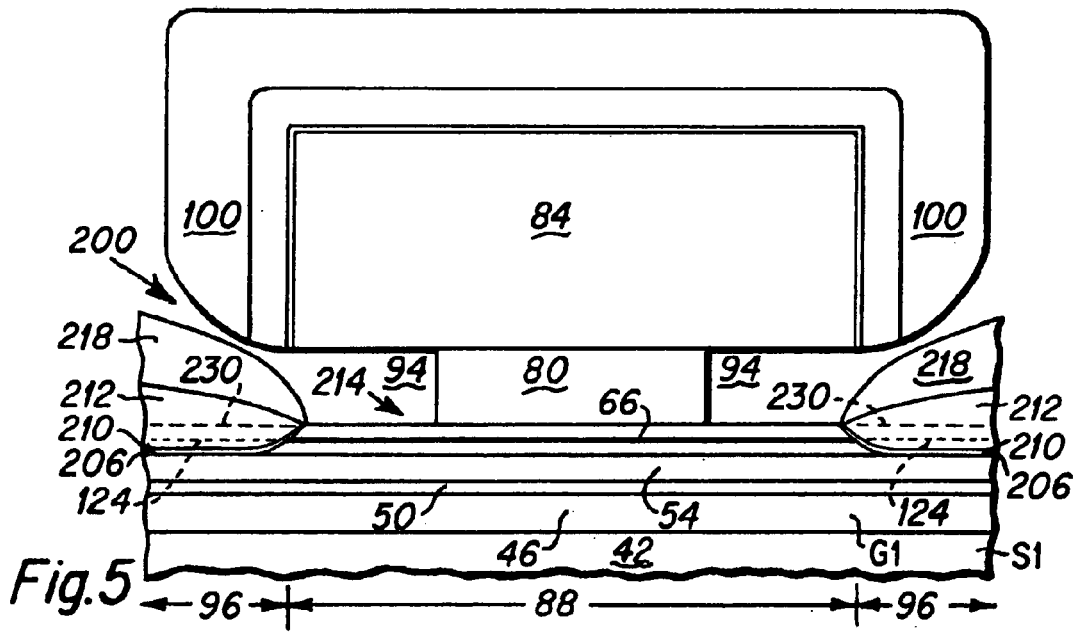
FIG. 5 is a side cross-sectional view depicting a GMR read head during the fabrication process of the GMR read head, as is used in the first embodiment of the present invention.
Figure 6:
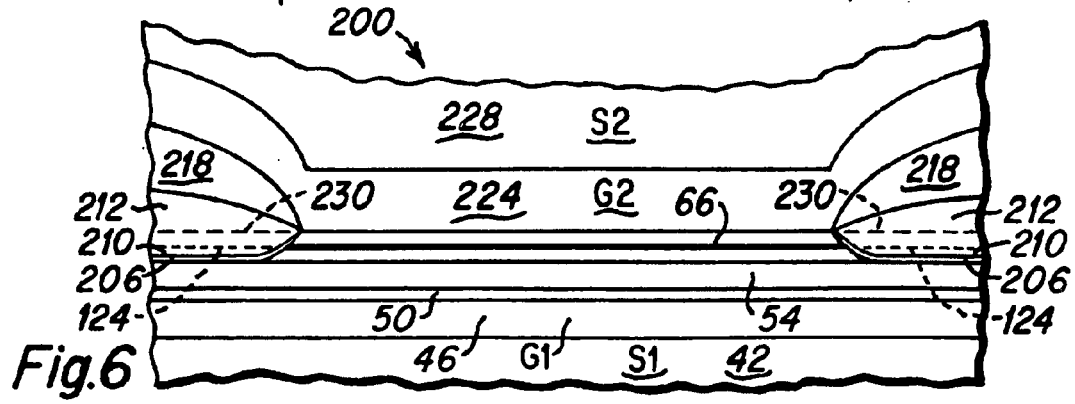
FIG. 6 is a side cross-sectional view depicting a GMR read head after completing the fabrication process of the GMR read head, as is used in the first embodiment of the present invention.

As is next described with the aid of FIGS. 5 and 6, the GMR read head 200 of the present invention provides a solution to the problems just described. FIG. 5 is a side cross-sectional view depicting a GMR read head during the fabrication of the first embodiment of the present invention, and FIG. 6 is a side cross-sectional view depicting a GMR read head after completing the fabrication process of the first embodiment of the present invention. In contrast to the prior art GMR read head depicted in FIGS. 2 and 3 that is confined in the read region, the lower portion of the GMR read head of this invention, including $Al_2O_3$/Ni—Cr—Fe/Ni—Fe/Pt—Mn films, is extended into the two side regions 96. In order to eliminate unwanted effects of microstructures of the lower portion of the GMR read sensor, an amorphous film 206, such as $WN_X$, is used as a separation layer to separate the lower portion of the GMR read sensor from the LB stack in each of the side regions. On top of the amorphous separation layer 206, a nonmagnetic film 210, such as W, and a Co—Pt—Cr hard magnetic film 212 are deposited.

In the fabrication process, as is depicted in FIG. 5, an $S_1$ layer 42 and a $G_1$ layer 46, preferably formed of a 1 μm Ni—Fe film and 10.6 nm thick $Al_2O_3$ film, respectively, are sequentially deposited on a wafer. Thereafter, a GMR read sensor 214, preferably comprising $Al_2O_3$(3)/Ni—Cr—Fe (3)/Ni—Fe(1)/Pt—Mn(15)/Co—Fe(1.6)/Ru(0.8)/Co—Fe(1.8)/Cu—O(2.2)/Co—Fe(2)/Cu(0.6)/Ta(6) films (thickness in nm), is then deposited on $G_1$ layer 46. After the depositions, the wafer is annealed in a 10 kOe magnetic field perpendicular to an alignment mark for 5 hours at 265° C. Bilayer photoresists, comprising a lower photoresist 80 and an upper photoresist 84, are then applied and exposed in a photolithographic tool to mask the GMR read sensor in a read region 88 for defining a sensor width, and subsequently developed in a solvent to form undercuts 94. Significantly, the GMR read sensor in unmasked side regions 96 is only partially removed by ion milling until the Pt—Mn film 54 is exposed. An LB stack, preferably comprising a 3 nm thick $WN_X$ film 206, a 3 nm thick W film 210 and a 40 nm thick Co—Pt—Cr hard magnetic film 212, is then deposited onto the unmasked side regions. Thereafter, the conductor 218, preferably comprising Cr(3)/Rh(80)/Ta(3) films, is also deposited onto the unmasked side regions 96. The bilayer photoresists are then lifted off. Subsequently, as depicted in FIG. 6, the GMR read sensor 214 is patterned for defining a sensor height, connected with a recessed conductor (preferably comprising a Ta(3)/Cu(80)/Ta(3) films), covered by a top gap $G_2$ layer 224 formed of a 32.4 nm thick $Al_2O_3$ film. A top shield layer ($S_2$) 228 preferably formed of a 1 μm thick Ni—Fe film is then deposited on the wafer. After photolithographic patterning of the $S_2$ layer into designed shapes and thus completing the fabrication process of the GMR read head 200, the fabrication process of the write head starts. After the completion of the fabrication processes of the GMR read and write heads, the GMR read and write heads are lapped along the alignment mark until designed sensor height and throat height are attained, and the magnetic head of the present invention is completed.

Figure 7:
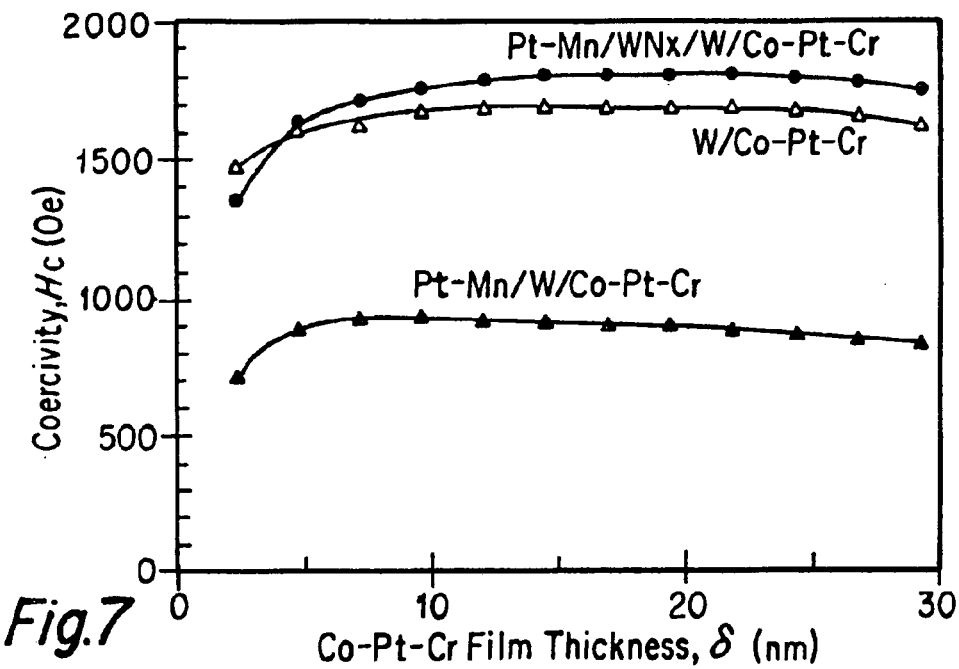
FIG. 7 is a chart showing the coercivity ($H_C$) versus the thickness (δ) of the Co—Pt—Cr film deposited on various seed layers used in the present invention.

Significantly, in the present invention, an amorphous film, such as the $WN_X$ film 206, is successfully used as a separation layer to separate the Pt—Mn film 54 from the W and Co—Pt—Cr films 210 and 212 respectively in each of the side regions, thereby eliminating unwanted effects of microstructure of the Pt—Mn film and maintaining a high $H_C$. FIG. 7 shows $H_C$ versus the Co—Pt—Cr film thickness for W(6)/Co—Pt—Cr, Pt—Mn(15)/W(6)/Co—Pt—Cr and Pt—Mn(15)/$WN_X$(3)/W(3)/Co—Pt—Cr films deposited on an $Al_2O_3$-coated substrate. The use of the underlying W film 210 leads the Co—Pt—Cr film to exhibit an $H_C$ of beyond 1,000 Oe. An X-ray diffraction pattern taken (not shown) from the W/Co—Pt—Cr films indicates that the W film grows "freely" on the amorphous $Al_2O_3$ film, exhibiting a bcc structure (a=0.317 nm) with its closest packed {110} crystalline planes lying in the film surface, and the Co—Pt—Cr film then grows "epitaxially" on the W film, exhibiting the hcp structure mainly with {01$\bar{1}$0} or {01$\bar{1}$1} crystalline planes lying in the film surface. The use of the W film 210 thus also causes the <0001> c-axis of the Co—Pt—Cr hcp structure (the easy axis of magnetization) to lie in the film surface, in order to achieve lattice matching between the W bcc {011} and the Co—Pt—Cr hcp {01$\bar{1}$0} (or {01$\bar{1}$1}) crystalline planes. Due to this epitaxial growth, in-plane magnetic properties of the Co—Pt—Cr hard magnetic film 212, including $H_C$, are thus improved.

It is significant that, if mild ion milling is applied so that the Pt—Mn film 54 is left in the side regions 96, and W/Co—Pt—Cr films are deposited thereon, the W/Co—Pt—Cr films exhibit a low $H_C$ due to unwanted lattice mismatching. This unwanted lattice mismatching is eliminated when the amorphous $WN_X$ film 206 separates the Pt—Mn film 54 from the W and Co—Pt—Cr films, 210 and 212 respectively. Since the mild ion milling only creates a shallow trench in the unmasked side regions, the midplane 230 of the Co—Pt—Cr film 212 deposited on the $WN_X$/W films within the shallow trench is located closer to the midplane 124 of the sense layer. As a result, an LB field induced from the Co—Pt—Cr film 212 can be high enough to stabilize the sense layer 66. In addition, the Co—Pt—Cr film 212 does not need to be very thick in order to stabilize the sense layer, and thus signal sensibility can remain high.

The mild ion milling also plays a crucial role in in-situ protecting the bottom gap layer $G_1$ 46 with the seed layer 50 and the residual Pt—Mn film 54 in the side regions, thereby protecting the bottom gap layer $G_1$ from air contamination. As a result, the probability of shorting between the bottom shield layer $S_1$ and the GMR read head can be substantially reduced.

In this first embodiment, the conducting, amorphous $WN_X$ film 206 is selected as the amorphous separation layer. A preferred as-deposited $WN_X$ film 206 with nitrogen contents x ranging from 36 to 46 at % has an electrical resistivity of 200 μΩ-cm and is amorphous. The $WN_X$ film 206 remains amorphous after annealing at temperatures below 500° C., and crystallization from the amorphous phase into a $W_2N$ compound occurs after annealing at 525° C. Other metallic films (e.g. W—Re films with Re contents ranging form 50 to 75 at %) can also be considered as the amorphous separation layer 206.

DETAILED DESCRIPTION OF THE SECOND EMBODIMENT

Figure 8:
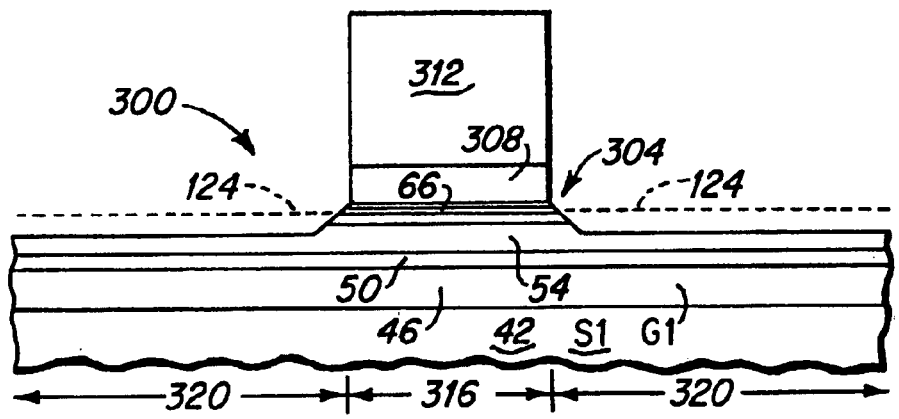
FIG. 8 is a side cross-sectional view depicting a GMR read head during the fabrication process of the GMR read head, as is used in the second embodiment of the present invention.
Figure 9:
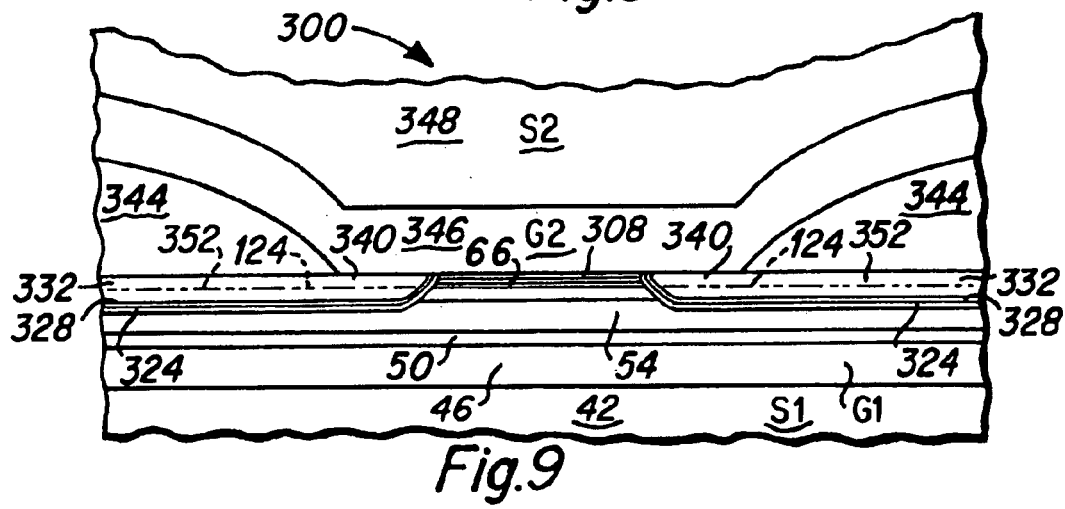
FIG. 9 is a side cross-sectional view depicting a GMR read head after completing the fabrication process of the GMR read head, as is used in the second embodiment of the present invention.

To more precisely locate the midplane 230 of the LB layer 212 at the same horizontal level as the midplane 124 of the sense layer 66 and to ensure uniform thicknesses of the separation, seed and LB layers at the sensor edges, photolithographic patterning with a monolayer photoresist is used in this second embodiment. FIG. 8 is a side cross-sectional view depicting a GMR read head during the fabrication process of this embodiment, and FIG. 9 is a side cross-sectional view depicting a GMR read head after completing the fabrication process of this second embodiment. As with the first embodiment, the lower portion of the GMR read head is extended into the two side regions 96, however, in this second embodiment the midplane 230 of the LB layer 212 is located at the same horizontal level as the midplane 124 of the sense layer 66, and the thicknesses of the separation, seed and LB layers are uniform at the sensor edges.

In the fabrication process of the second embodiment, as is depicted in FIG. 8, an $S_1$ 42 and a $G_1$ 46, preferably formed of a 1 μm Ni—Fe film and 10.6 nm thick $Al_2O_3$ film, respectively, are sequentially deposited on a wafer. Thereafter, a GMR read sensor 304, preferably comprising $Al_2O_3$(3)/Ni—Cr—Fe(3)/Ni—Fe(1)/Pt—Mn(15)/Co—Fe (1.6)/Ru(0.8)/Co—Fe(1.8)/Cu—O(2.2)/Co—Fe(2)/Cu(0.6)/Ta(1.8) films (thickness in nm), is then deposited on the $G_1$ 42. An electrically insulating layer 308, preferably formed of a 18 nm thick $SiO_2$ film, is then deposited on the GMR read sensor 304. After the depositions, the wafer is annealed in a 10 kOe magnetic field perpendicular to an alignment mark for 5 hours at 265° C. A monolayer photoresist 312 is then applied and exposed in a photolithographic tool to mask the GMR read sensor in a read region 316 for defining a sensor width, and subsequently developed to remove the monolayer photoresist in the unmasked side regions 320. Reactive-ion-etching (RIE) is applied to completely remove the electrically insulating layer 308 in the unmasked side regions, and ion milling is then applied to remove the upper portion of the GMR read sensor until the Pt—Mn film 54 is exposed. The monolayer photoresist 312 is then lifted off. Subsequently, as is depicted in FIG. 9, the LB stack, preferably comprising $WN_X$(3)/W(3)/Co—Pt—Cr(12.8) films, 324, 328 and 332 respectively, is then deposited on the entire wafer. Chemical mechanical polishing (CMP) is then applied to the entire wafer until the $SiO_2$ film 308 is exposed and its thickness is reduced from 18 to 3 nm. Since the $SiO_2$ film is transparent, its thickness can be precisely monitored by an ellipsometer. Bilayer photoresists are then applied and exposed in a photolithographic tool to mask the GMR read sensor in a read region and part 340 of the LB stack, and subsequently developed in a solvent to form undercuts. The conductor 344, preferably comprising Ta(3)/Rh(80)/Ta(3) films, is then deposited onto the unmasked regions. The bilayer photoresists are then lifted off. Subsequently, the GMR read sensor is patterned for defining a sensor height, connected with a recessed conductor (preferably comprising a Ta(3)/Cu(80)/Ta(3) films), covered by a top gap layer $G_2$ 346 preferably formed of a 33.6 nm thick $Al_2O_3$ film. A top shield layer ($S_2$) 348, preferably formed of a 1 μm thick Ni—Fe film, is then deposited on the wafer. After photolithographic patterning of the $S_2$ into designed shapes and then completing the fabrication process of the GMR read head 300, the fabrication process of the write head starts. After the completion of the fabrication processes of the GMR read and write heads, the GMR read and write heads are lapped along the alignment mark until designed sensor height and throat height are attained to complete the fabrication of the integrated read/write heads of the magnetic head 300 of this second embodiment.

In this second embodiment, the midplane 352 of the LB layer 332 can be precisely located at the same horizontal level as the midplane 124 of the sense layer 66 by partial ion milling of the Pt—Mn film 54 in the side regions and CMP of the $SiO_2$ film 308 to a desired thickness. In addition, due to the nonexistence of shadowing effects in forming the LB stack, a uniform thickness of the separation 324, seed 328 and LB layers 332 can be attained at the sensor edges. Hence, the seed and Co—Pt—Cr films deposited within the shallow trench can be the same as designed. Particularly, the deposited Co—Pt—Cr hard magnetic film 332 can be as thin as 12.8 nm (corresponding to a magnetic moment of three times of the sense layer 66), but the magnetic moment at the sensor edges can already be higher than that of the sense layer 66. As a result, the sense layer is stabilized, and high signal sensitivity and high read efficiency can be maintained.

DETAILED DESCRIPTION OF THE THIRD EMBODIMENT

Figure 10:
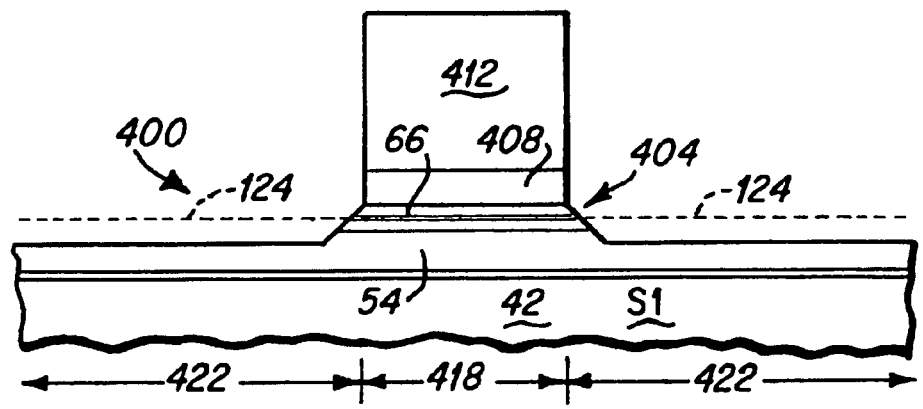
FIG. 10 is a side cross-sectional view depicting a TMR read head during the fabrication process of the TMR read head, as is used in the third embodiment of the present invention.
Figure 11:
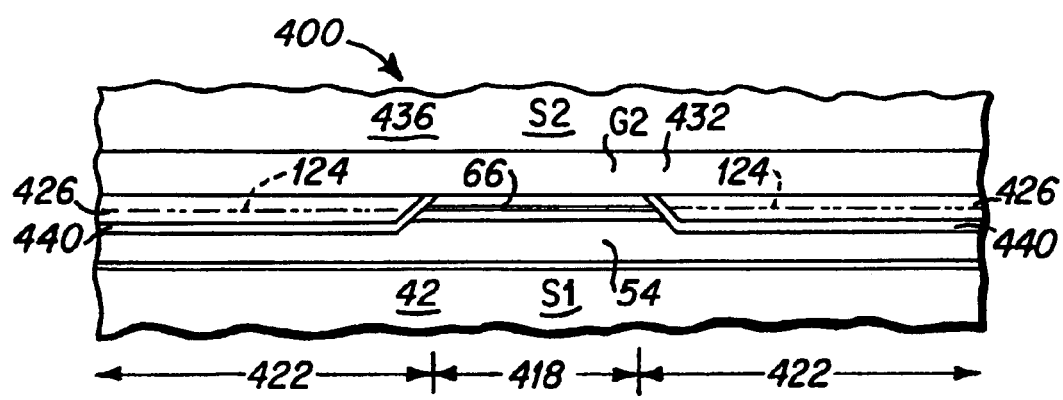
FIG. 11 is a side cross-sectional view depicting a TMR read head after completing the fabrication process of the TMR read head, as is used in the third embodiment of the present invention.

The fabrication process of the GMR read head as described in the second embodiment of the present invention can also be applied to the fabrication process of a tunneling magnetoresistance (TMR) read head which will play a more crucial role in ultrahigh density magnetic recording. FIG. 10 is a side cross-sectional view depicting a TMR read head 400 during the fabrication process of this third embodiment of the present invention, and FIG. 11 is a side cross-sectional view depicting a TMR read head 400 after completing the fabrication process of this third embodiment of the present invention.

In the fabrication process, as is depicted in FIG. 10, a bottom shield layer ($S_1$) 42, preferably formed of a 1 μm thick Ni—Fe film, is deposited on a wafer. Thereafter, a TMR read sensor 404, preferably comprising Ta(3.2)/Ni—Fe(1)/Pt—Mn(20)/Co—Fe(1.6)/Ru(0.8)/Co—Fe(1.8)/Al—O(0.6)/Co—Fe(2)/Cu(0.6)/Ru(8.4) films is then deposited on the $S_1$ 42. An electrically insulating layer, preferably formed of a 18 nm thick $SiO_2$ film 408, is then deposited on the TMR read sensor. After the depositions, the wafer is annealed in a 10 kOe magnetic field perpendicular to an alignment mark for 5 hours at 265° C. A monolayer photoresist 412 is then applied and exposed in a photolithographic tool to mask the TMR read sensor in a read region 418 for defining a sensor width, and subsequently developed to remove the monolayer photoresist 412 in the unmasked side regions 422. Reactive-ion-etching (RIE) is applied to completely remove the $SiO_2$ film in the unmasked side regions 422, and ion milling is then applied to remove the upper portion of the TMR read sensor until the Pt—Mn film 54 is exposed. The monolayer photoresist 412 is then lifted off. Subsequently, as is depicted in FIG. 11, the LB stack 426, preferably comprising $WO_Y$(3)/W(3)/Co—Pt—Cr(12.8) films, is then deposited on the entire wafer. Chemical mechanical polishing (CMP) is then applied to the wafer until the $SiO_2$ film 408 is completely removed. Since the $SiO_2$ film is transparent, any unwanted residual $SiO_2$ film can be detected by an ellipsometer. A 23.6 nm thick Ta film 432 and a top shield layer ($S_2$) 436, preferably formed of a 1 μm thick Ni—Fe film, are then sequentially deposited on the wafer. After photolithographic patterning of the $S_2$ into designed shapes and then completing the fabrication process of the TMR read head 400, the fabrication process of the write head starts. After the completion of the fabrication processes of the TMR read and write heads, the TMR read and write heads are lapped along the alignment mark until designed sensor height and throat height are attained, and the integrated read/write heads of the third embodiment completed.

In this embodiment, the insulating, amorphous $WO_Y$ film 440, where Y is approximately 10 to 50 at. %, is selected as a separation layer since it is not prone to chemical etching used in the photolithographic patterning process. In contrast to the conventional used $Al_2O_3$ film which is partially removed by chemical etching and thus cannot act as a good separation layer, the $WO_Y$ film which stays intact after chemical etching appears to be a much more robust separation layer. In addition to the $WO_Y$ film, many other insulating, amorphous films, such as $SiO_2$, $CrO_X$, etc., can also be selected as separation layers. It is crucial to ensure good insulation of selected separation layers, so that a sense current can only flow through the thin Al—O barrier layer to exhibit desired TMR effects While the present invention has been shown and described with regard to certain preferred embodiments, it will be understood that those skilled in the art will no doubt develop certain alterations and modifications thereto which nevertheless include the true spirit and scope of the invention. It is therefore intended that the following claims cover all such alterations and modifications.

What is claimed is:

1. A magnetic head comprising:
   a read sensor including a pinning layer;
   the magnetic head also including a longitudinal bias (LB) stack being disposed in side regions located at side edges of said read sensor;
   said LB stack being fabricated upon portions of said pinning layer, and said LB stack including an amorphous film being disposed upon said pinning layer, a nonmagnetic film being disposed upon said amorphous film and a hard magnetic film being disposed upon said nonmagnetic film.

2. A magnetic head as described in claim 1 wherein said amorphous film is comprised of $WN_x$, where x is approximately 36 to 46 at. %.

3. A magnetic head as described in claim 2 wherein said nonmagnetic film is comprised of a material selected from the group consisting of W, W—Cr, W—Ti, and W—Mo.

4. A magnetic head as described in claim 3 wherein said hard magnetic film is comprised of Co—Pt—Cr or Co—Pt.

5. A magnetic head as described in claim 4 wherein said pinning layer is Pt—Mn.

6. A magnetic head as described in claim 3 wherein said amorphous film has a thickness of from approximately 1 nm to approximately 10 nm.

7. A magnetic head as described in claim 6 wherein said nonmagnetic film has a thickness of from approximately 1 nm to approximately 10 nm.

8. A magnetic head as described in claim 7 wherein said amorphous film has a thickness of approximately 3 nm and said nonmagnetic film has a thickness of approximately 3 nm.

9. A magnetic head as described in claim 2 wherein said nonmagnetic film is comprised of a material selected from the group consisting of Cr, Cr—Ti, Cr—W and Cr—Mo.

10. A magnetic head as described in claim 1 wherein said nonmagnetic film exhibits a body-centered-cubic (bcc) crystalline structure.

11. A magnetic head comprising:

a bottom magnetic shield layer ($S_1$);

a bottom insulation layer ($G_1$);

seed layers being fabricated above said $G_1$;

an antiferromagnetic pinning layer being fabricated above said seed layers;

pinned layers being fabricated above said antiferromagnetic pinning layer;

a spacer layer being fabricated above said pinned layers;

a ferromagnetic sense layer being fabricated above said spacer layer, said sense layer having a midplane thereof;

a cap layer being fabricated above said ferromagnetic sense layer;

a top insulation layer ($G_2$) being fabricated above said cap layer;

a top magnetic shield layer ($S_2$) being fabricated above said $G_2$ layer;

a longitudinal bias (LB) stack being fabricated upon portions of said pinning layer, said LB stack comprising an amorphous film, a nonmagnetic film and a hard magnetic film, and wherein said hard magnetic film has a midplane that is disposed at a horizontal level within the magnetic head that is approximately the same as said midplane of said sense layer.

12. A magnetic head as described in claim 11 wherein said amorphous film is fabricated upon portions of said pinning layer.

13. A magnetic head as described in claim 12 wherein said amorphous film is electrically conductive and said nonmagnetic film has a bcc crystalline structure.

14. A magnetic head as described in claim 13 wherein said amorphous film is comprised of a material selected from the group consisting of $WN_x$ where x is approximately 36 to 46 at. %, W—Re where the Re content is approximately 50 to 75 at. %, and $WO_Y$ where the oxygen content Y is approximately 10 to 50 at. %, and wherein said nonmagnetic film is comprised of a material selected from the group consisting of Cr, a Cr-based alloy, W, and a W-based alloy, and wherein said hard magnetic film is comprised of Co—Pt—Cr or Co—Pt, and wherein said pinning layer is a Cr-based alloy of Pt—Mn.

15. A magnetic head as described in claim 14 wherein said amorphous film has a thickness of from approximately 1 nm to approximately 10 nm, and wherein said nonmagnetic film has a thickness of from approximately 1 nm to approximately 10 nm.

16. A hard disk drive including a magnetic head comprising:

a bottom magnetic shield layer ($S_1$);

a bottom insulation layer ($G_1$);

seed layers being fabricated above said $G_1$ layer;

an antiferromagnetic pinning layer being fabricated above said seed layers;

pinned layers being fabricated above said antiferromagnetic pinning layer;

a spacer layer being fabricated above said pinned layer;

a ferromagnetic sense layer being fabricated above said spacer layer, said sense layer having a midplane thereof;

a cap layer being fabricated above said ferromagnetic sense layer;

a top insulation layer ($G_2$) being fabricated above said cap layer;

a top magnetic shield layer ($S_2$) being fabricated above said $G_2$;

a longitudinal bias (LB) stack being fabricated upon portions of said pinning layer, said LB stack comprising an amorphous film, a nonmagnetic film and a hard magnetic film, and wherein said hard magnetic film has a midplane that is disposed at a horizontal level within the magnetic head that is approximately the same as said midplane of said sense layer.

17. A hard disk drive as described in claim 16 wherein said amorphous film is fabricated upon portions of said pinning layer.

18. A hard disk drive as described in claim 17 wherein said amorphous film is electrically conductive and said nonmagnetic film has a bcc crystalline structure.

19. A hard disk drive as described in claim 18 wherein said amorphous film is comprised of a material selected from the group consisting of $WN_x$ where x is approximately 36 to 46 at. %, W—Re where the Re content is approximately 50 to 75 at. %, and $WO_Y$ where the oxygen content Y is approximately 10 to 50 at. %, and wherein said nonmagnetic film is comprised of a material selected from the group consisting of Cr, a Cr-based alloy, W, and a W-based alloy, and wherein said hard magnetic film is comprised of Co—Pt—Cr or Co—Pt, and wherein said pinning layer is a Cr-based alloy of Pt—Mn.

20. A hard disk drive as described in claim 19 wherein said amorphous film has a thickness of from approximately 1 nm to approximately 10 nm, and wherein said nonmagnetic film has a thickness of from approximately 1 nm to approximately 10 nm.

* * * * *